United States Patent Office 3,192,244
Patented June 29, 1965

3,192,244
PROCESS FOR PURIFICATION OF THIOPHOS-
PHORIC ACID ESTERS
Roy V. High, Jr., Union, N.J., assignor to Esso Research
and Engineering Company, a corporation of Delaware
No Drawing. Filed Nov. 1, 1962, Ser. No. 234,850
3 Claims. (Cl. 260—461)

The present invention concerns improved additives for imparting antiwear properties and reducing corrosiveness in lubricating oil compositions. The invention also concerns the preparation of such additives by treatment of dialkyl dithiophosphoric acids with epoxides.

It is known to prepare lubricating oil additives having antiwear and antioxidant and anticorrosion properties by reaction of alkyl substituted dithiophosphoric acids with epoxides such as ethylene oxide or propylene oxide. The preparation of such additives is taught, for example, in the McDermott Patents 2,783,204 and 2,844,616. The reaction involved in treating the dialkyl substituted dithiophosphoric acids with alkylene oxides of 2 to 8 carbon atoms is believed to be as follows:

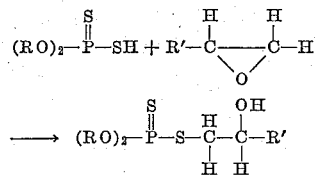

where R is preferably an alkyl radical of from 3 to 20 carbon atoms and R' is hydrogen or an alkyl group of 1 to 4 carbon atoms.

The preparation of dialkyl dithiophosphoric acids by reaction of aliphatic alcohols with $P_2S_5$ is also well known. Usually, a mixture of alcohols is employed, such as a combination of isopropyl alcohol and methylisobutyl-carbinol or a combination of isobutyl alcohol and primary amyl alcohol.

While the reaction equation involved in the treatment with epoxides may be written simply as noted above, in actual practice the crude dialkyl dithiophosphoric acids that are obtained on reaction of aliphatic alcohols with $P_2S_5$ contain as much as 20% of unstable sulfides, more particularly mixed polysulfides of the acids. These materials, known as "neutrals," because they contain unacidified sulfur, may be represented by the formula:

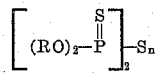

wherein $n$ is an integer, 1 to 4. Usually, the disulfides and trisulfides predominate in the neutrals, i.e. $n$ is 2 or 3, and the composition of the mixture will vary from batch to batch.

It has now been found, and this finding forms the basis of the present invention, that if the "neutrals" are removed from the crude dialkyl dithiophosphoric acids before the epoxide adducts are formed, the adducts subsequently obtained are markedly superior in anti-wear properties and corrosion inhibiting power to the adducts that are prepared from the crude dialkyl dithiophosphoric acids. Briefly, the refining of the crude acids to remove the "neutrals" involves the steps of forming water-soluble salts of the crude acids, for example alkali metal or ammonium salts, followed by removal of the neutrals by solvent extraction, regenerating the "neutral-free" dialkyl dithiophosphoric acids by treating the aqueous layer with dilute mineral acid and then removing the "neutral-free" acids from the aqueous layer by solvent extraction.

In preparing the dialkyl dithiophosphoric acids, normally 4 moles of alcohol or of a mixture of alcohols are reacted with 1 mole of phosphorus pentasulfide. The alcohols should be free of water. Reaction temperatures in the range of from about 100° to about 250° F. are employed, and reaction times may vary in the range of from about 1 to 6 hours. A convenient method for controlling the end point of the reaction is to measure the specific gravity of the reaction product, which will of course vary with the reaction temperature and with the excess alcohol content. The end point can also be determined by noting when the evolution of $H_2S$ ceases. As soon as the end point has been reached, the reaction product is cooled to a temperature below 100° F., preferably while being stripped with an inert gas such as nitrogen.

Among the dialkyl dithiophosphoric acids which may be used in practicing the present invention are included diisobutyl dithiophosphoric acid, di-tert.-octyl dithiophosphoric acid, dilauryl dithiophosphoric acid, mixed isopropyl $C_8$ oxo dithiophosphoric acid, mixed isobutyl primary amyl dithiophosphoric acid, mixed dithiophosphoric acids derived from mixed alcohols from paraffin wax oxidation, mixed hexyl stearyl dithiophosphate, mixed dithiophosphates derived from mixed $C_{10}$ to $C_{18}$ alcohols known as "Lorol" alcohols, and mixed isopropyl $C_{13}$ oxo dithiophosphoric acid.

The following is a description of the preferred procedure for refining the dialkyl dithiophosphoric acids, in accordance with the present invention, prior to the treatment with an epoxide.

The treatment of dialkyl dithiophosphoric acids to remove the "neutrals" is carried out at ordinary temperatures (60° F.–90° F.). The dialkyl dithiophosphoric acid is neutralized with an equal molal amount of an alkali metal hydroxide or ammonium hydroxide, the hydroxide being preferably about 2 to 3 normal in concentration. After intimate mixing of the dialkyl dithiophosphoric acid and the hydroxide, the "neutrals" are separated from the aqueous layer by solvent extraction with a suitable hydrocarbon, such as hexane, the extraction taking place at ambient temperature. The extraction may be done in one or more steps. In each step of the extraction, it is preferred that the volume of the hydrocarbon solvent be approximately equal to the volume of the original acid charge. It should be noted that at all times, the neutrals and alkali metal salts remain in solution, and the extraction process consists of the removal of a liquid from a liquid. In place of hexane other suitable aliphatic hydrocarbon solvents that may be employed in the solvent extraction include pentane and heptane, although hexane is preferred.

After the "neutrals" have been extracted from the aqueous layer, the latter is acidified with hydrochloric acid or sulfuric acid, preferably the latter. The acidified mixture is then extracted with hexane or an equivalent solvent and the purified dialkyl dithiophosphoric acids are recovered from the extract.

The epoxides which may be reacted with the refined dialkyl dithiophosphoric acids in accordance with this invention include particularly the well-known alkylene oxides such as ethylene oxide, propylene oxide, butylene oxide, isobutylene oxide, amylene oxide, and styrene oxide. Because of their low cost and commercial availability ethylene oxide and propylene oxide are preferred.

The reaction between the dialkyl dithiophosphoric acid and the epoxide is a spontaneous exothermic reaction which takes place immediately upon contact of the reactants at ordinary room temperatures and may be conveniently conducted by adding the epoxide slowly with rapid stirring to the reaction mixture, the temperature being controlled within the range of 50° to 200° F. by means of a water bath or ice bath. Preferably, equimolar proportions of reactants are used. No catalyst is ordinarily required. The time needed for completing the reaction is no more than 2 hours and is ordinarily much less than this. While solvents are not normally required, in some cases it may be convenient to conduct the reaction in the presence of an inert solvent such as ethylene dichloride, benzene, xylene, or a mineral oil.

The following examples illustrate the operation of this invention.

EXAMPLE 1

Mixed dialkyl dithiophosphoric acids were prepared by reacting 35 weight percent of primary amyl alcohols and 65 weight percent of isobutyl alcohol with phosphorus pentasulfide, using a mole ratio of alcohol to $P_2S_5$ of 4 to 1. The reaction was conducted at about 170° F. for a period of from 3 to 4 hours until a specific gravity of about 1.04 to 1.05 was attained, measured at 78° F. The reaction product was then stripped of hydrogen sulfide with the aid of a stream of nitrogen, the product being cooled to about 90 to 100° F. The product was then filtered.

EXAMPLE 2

The crude mixed dialkyl dithiophosphoric acids (DDPA) of Example 1 were treated in the following manner to remove the "neutrals" therefrom.

To 1 mole (251 g.) of dialkyl dithiophosphoric acid (DDPA) from Example 1 was added 500 ml. of 2 N-ammonium hydroxide. The hydroxide and DDPA were shaken together in a separatory funnel. After standing to permit phase formation, 200 ml. hexane was added to the contents of the separatory funnel and the shaking was repeated. After standing, the aqueous layer containing the ammonium salt of DDPA was separated from the hexane layer containing the "neutrals." The extraction was repeated, and the two aqueous layers were combined. The combined aqueous portion was then acidified with 2 N sulfuric acid, and the acid and aqueous fraction were agitated vigorously in a separatory funnel. The purified DDPA was then recovered by solvent extraction with hexane. This was accomplished in two steps, using a volume of hexane in each step approximately equal to the original acid charge. The aqueous layer was discarded, and the hexane was removed from the "neutral"-free DDPA by blowing with $N_2$ at ambient temperature.

To effect a material balance, the two hexane extracts containing the neutrals were combined and then evaporated by blowing with nitrogen. Of an original charge of 251 g. crude DDPA, a recovery of 222 g. "neutral"-free DDPA and 23 g. of "neutrals" was made, thus accounting for 97.6% of the original crude DDPA.

EXAMPLE 3

One mole (251 g.) of crude mixed dialkyl dithiophosphoric acids (DDPA) from Example 1 was placed in a 500 ml. reaction vessel equipped with a stirrer, thermometer well, reflux condenser, and dropping funnel. One mole of propylene oxide was added to the dropping funnel. The reaction vessel was placed in a wet ice bath and the temperature of the crude DDPA was lowered to 50° F. before the reaction was started. The propylene oxide was added at the rate of 1.5-2.0 ml./minute so that the temperature could be maintained between 50° and 70° F. Upon completing the addition of propylene oxide, the wet ice bath was removed. The contents of the reaction flask were blown with $N_2$ at ambient temperature for one hour.

EXAMPLE 4

One mole (251 g.) of neutral-free DDPA from Example 2 was reacted with one mole of propylene oxide in the same manner as in Example 3.

EXAMPLE 5

A mixture of crude dialkyl dithiophosphoric acids is prepared by reaction of a mixture of 30 weight percent of isopropyl alcohol and 70 weight percent of methyl isobutyl carbinol with $P_2S_5$ in a mole ratio of one mole of the latter to 4 moles of mixed alcohols. The crude acids are converted to their sodium salts by treatment with 3 normal NaOH solution and, in the manner of Example 2, the aqueous solution of salts is extracted with hexane, the extracted salts are acidified with sulfuric acid, and the purified dialkyl dithiophosphoric acids are recovered by hexane extraction. The purified acids are then treated with ethylene oxide on an approximately equimolal basis in the general manner of Example 3. The resulting product is incorporated in 0.3 weight percent concentration in a mineral lubricating oil of SAE 20 viscosity grade.

EXAMPLE 6

Compositions were prepared using as the base oil a mixture of 97 weight percent of a solvent refined neutral mineral oil (325 SSU viscosity at 100° F.), 2.7 weight percent of commercial detergent inhibitor concentrates and 0.3 weight percent of a pour point depressant. Sufficient of the adducts of Examples 3 and 4 were added to separate portions of the base oil to supply in each composition 0.1 weight percent of phosphorus. Each of these compositions and the base oil were compared in the well-known Shell Four-Ball Wear Test. The test was conducted as follows. The test lubricant is placed in the cup of the machine and heated to 150° C. The test cup contains three steel balls which are fixed in position by a screw cap. A fourth steel ball, held in a chuck, is pressed against the three lower balls with a force of 10 kilograms and is rotated at 1800 r.p.m. for a period of 2 hours. At the end of the test, the amount of wear is determined by measuring the diameter of the wear scar on each of these balls and averaging the results.

The results obtained in the wear test are shown in Table I.

Table I

| Test oil: | Wear scar diameter, mm. |
|---|---|
| Base oil | 0.530 |
| Base oil plus epoxide adduct of Example 3 [1] | 0.412 |
| Base oil plus epoxide adduct of "neutrals"-free acids (Example 4) [1] | 0.215 |

[1] Each blend contained sufficient additive to furnish 0.1 weight percent phosphorus.

It will be seen that while each of the adducts reduced the wear, the adduct prepared from the "neutrals"-free dithiophosphoric acids gave essentially half as much wear as the blend containing the adduct prepared from the crude dithiophosphoric acids.

EXAMPLE 7

Each of the blends of Example 6 was also subjected to the Chevrolet L-4 Test, which is a standard test having the designation CRC L-4-545. This test is used to determine the corrosion inhibiting effectiveness of additives. In this test, a bearing weight loss of no more than 150 milligrams is considered good. The results obtained in the Chevrolet L-4 Test are shown in Table II.

Table II

| | Bearing wt. loss, mg. |
|---|---|
| Base oil plus epoxide adduct of Example 3 | 654 |
| Base oil plus epoxide adduct of "neutrals"-free acids (Example 4) | 114 |

The additives of this invention may be added to lubricating oil compositions in concentrations within the range of from about 0.03 to about 5 percent by weight, or more generally from about 0.1 to about 2 weight percent based on the total composition, the concentration being governed in general by the requirements of the particular use and the nature of the base stock. Various mineral and synthetic lubricating oil base stocks may be employed. The base stock may be any suitable oil of lubricating viscosity grade, including straight mineral oil fractions or distillates derived from the ordinary paraffinic, naphthenic, asphaltic or mixed base crude oils by the usual refining methods including solvent extraction, treatment with acid, alkali, clay, aluminum chloride, and the like, hydrogenation treatment, and so on. Synthetic oils may be of the hydrocarbon type or they may be of the ester type such as di-2-ethyl hexyl sebacate, $C_{13}$ oxo acid diesters of tetraethylene glycol, etc.

The additives of the invention may be employed in lubricants in conjunction with other additives such as detergent type additives, e.g. metal organic sulfonates, metal alkyl phenol sulfides, etc., pour point depressants, dyes, antioxidants, and the like. The lubricant compositions may comprise crankcase oils, hydraulic fluids, cutting oils, flushing oils, industrial oils, greases, torque converter fluids, and the like. The additives may also be employed in concentrations of 0.01 to 2 weight percent in petroleum middle distillate fuels to reduce corrosion and to reduce the wear of parts coming into contact with those fuels, which include heating oils, diesel fuels, and jet fuels.

It is to be understood that the examples herein presented are for the purpose of illustrating the invention and that they are not presented by way of limiting the invention, whose scope is to be determined by the claims appended hereto.

What is claimed is:

1. An improved method for refining a dialkyl dithiophosphoric acid that has been obtained by reaction of about 4 moles of an aliphatic alcohol of from 3 to 20 carbon atoms with about one mole of $P_2S_5$ which comprises treating the said dialkyl dithiophosphoric acid, to remove unstable sulfides therefrom, by converting the said dialkyl dithiophosphoric acid to a water-soluble salt selected from the group consisting of alkali metal salts and ammonium salts, contacting an aqueous solution of the said salt with an aliphatic hydrocarbon solvent whereby unstable sulfides are extracted therefrom, separating the extracted aqueous solution from the hydrocarbon solvent containing said sulfides, thereafter treating the extracted aqueous solution with dilute mineral acid to regenerate dialkyl dithiophosphoric acid, thereafter extracting the resulting aqueous solution of regenerated dialkyl dithiophosphoric acid with a hydrocarbon solvent and recovering regenerated dialkyl dithiophosphoric acid from said last named solvent.

2. Improved method as defined by claim 1 wherein said aliphatic hydrocarbon solvent is hexane.

3. In the preparation of an oil-soluble additive by reaction of about equimolar proportions of an epoxide of from 2 to 8 carbon atoms with a dialkyl dithiophosphoric acid that has been obtained by reaction of about 4 moles of an aliphatic alcohol of from 3 to 20 carbon atoms with about one mole of $P_2S_5$, the improvement which comprises treating the dialkyl dithiophosphoric acid, prior to the epoxidation step, to remove unstable sulfides therefrom, said treating comprising the steps of converting the said dialkyl dithiophosphoric acid to a water-soluble salt selected from the group consisting of alkali metal salts and ammonium salts, contacting an aqueous solution of the said salt with an aliphatic hydrocarbon solvent whereby unstable sulfides are extracted therefrom, separating the extracted aqueous solution from the hydrocarbon solvent containing said sulfides, thereafter treating the extracted aqueous solution with dilute mineral acid to regenerate dialkyl dithiophosphoric acid, thereafter extracting the resulting aqueous solution of regenerated dialkyl dithiophosphoric acid with a hydrocarbon solvent and recovering regenerated dialkyl dithiophosphoric acid from said last named solvent.

References Cited by the Examiner

UNITED STATES PATENTS

| 2,783,204 | 2/57 | McDermott | 252—46.6 |
| 2,844,616 | 7/58 | McDermott | 252—46.6 X |

FOREIGN PATENTS

| 796,181 | 6/58 | Great Britain. |

DANIEL E. WYMAN, *Primary Examiner.*